Nov. 8, 1938.  E. H. GILL  2,135,573
COMBINATION SEMITRAILER TANK AND GENERAL DELIVERY BODY
Filed July 3, 1936  5 Sheets-Sheet 1
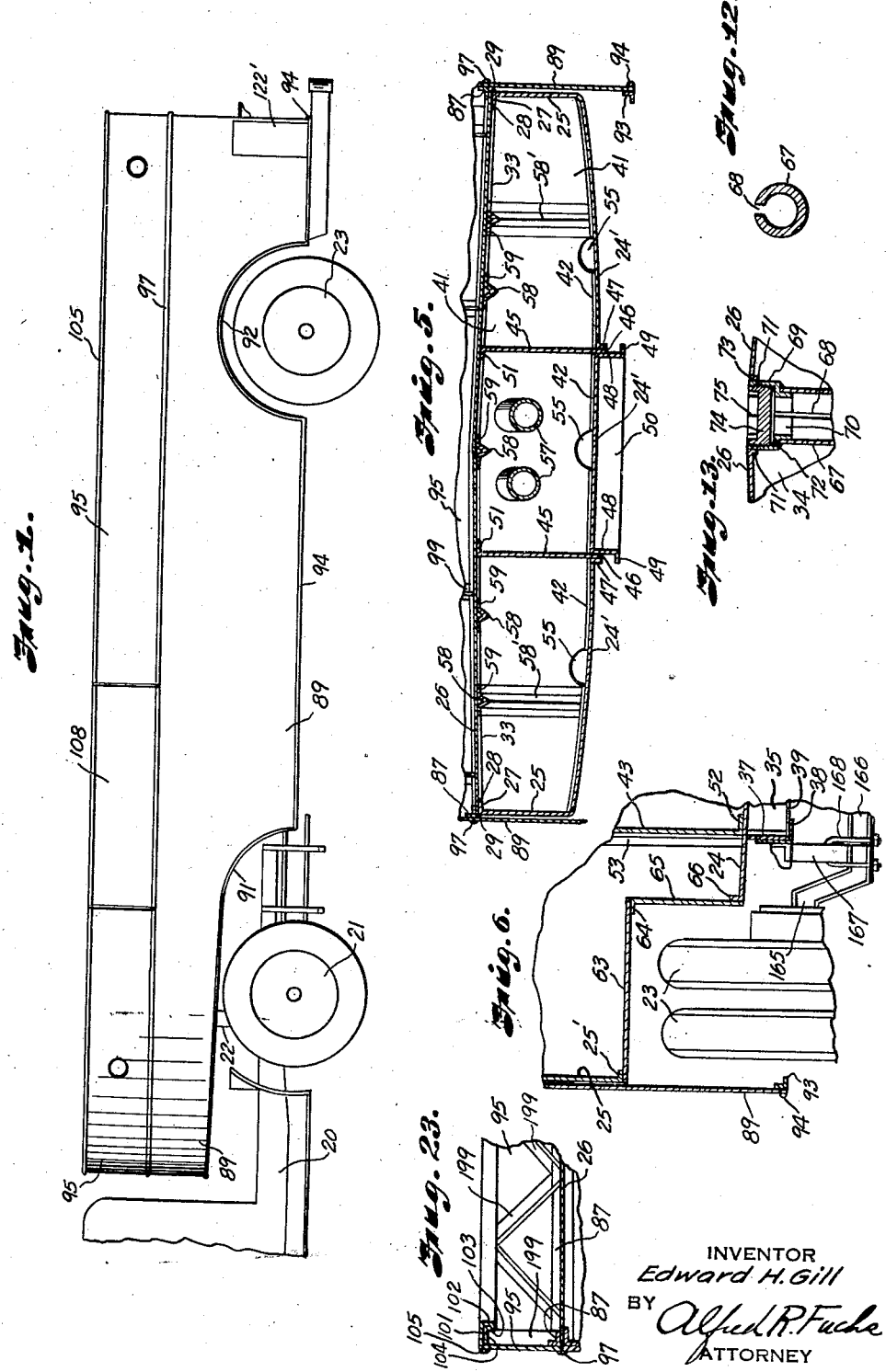
INVENTOR
Edward H. Gill
BY
Alfred R. Fuchs
ATTORNEY Nov. 8, 1938.                     E. H. GILL                    2,135,573
           COMBINATION SEMITRAILER TANK AND GENERAL DELIVERY BODY
                          Filed July 3, 1936            5 Sheets-Sheet 2
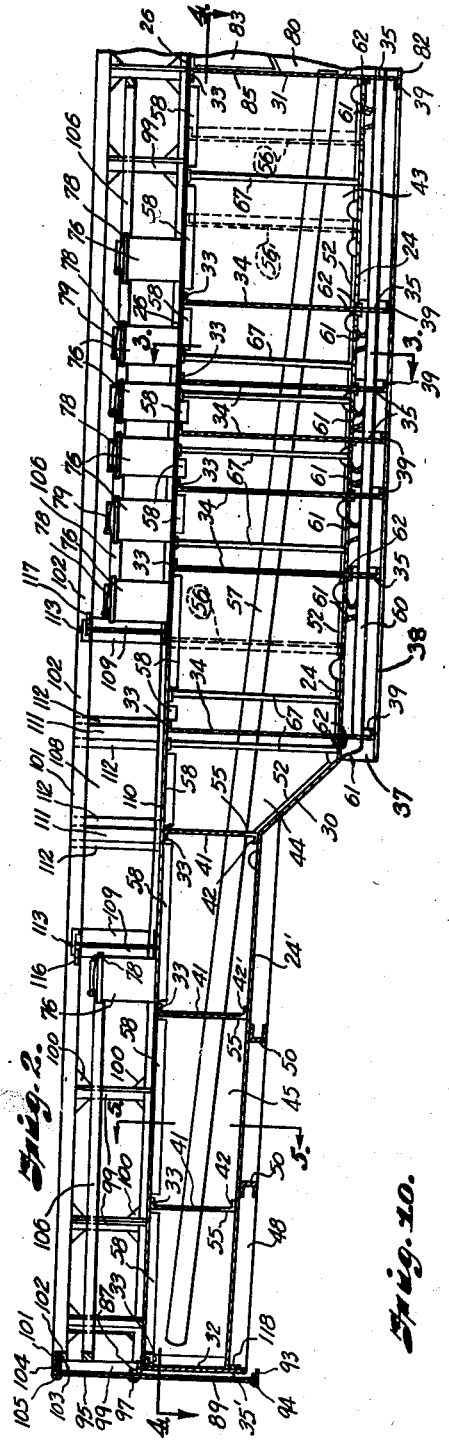
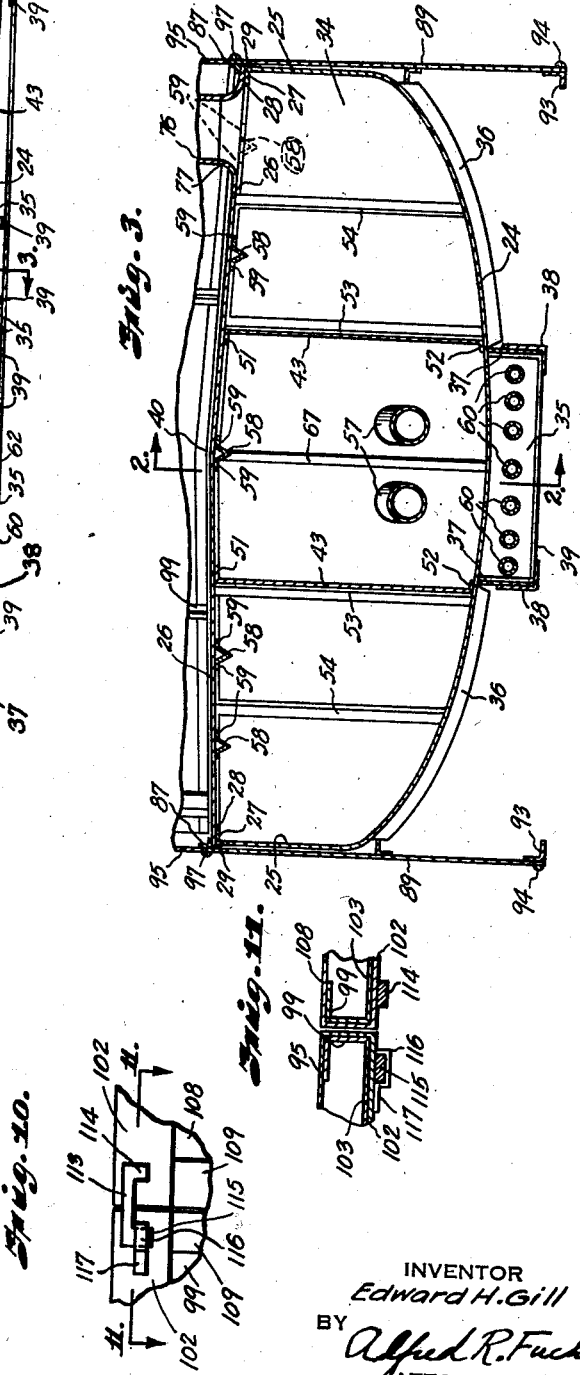
INVENTOR
Edward H. Gill
BY
Alfred R. Fuchs
ATTORNEY Nov. 8, 1938.   E. H. GILL   2,135,573
COMBINATION SEMITRAILER TANK AND GENERAL DELIVERY BODY
Filed July 3, 1936   5 Sheets-Sheet 3
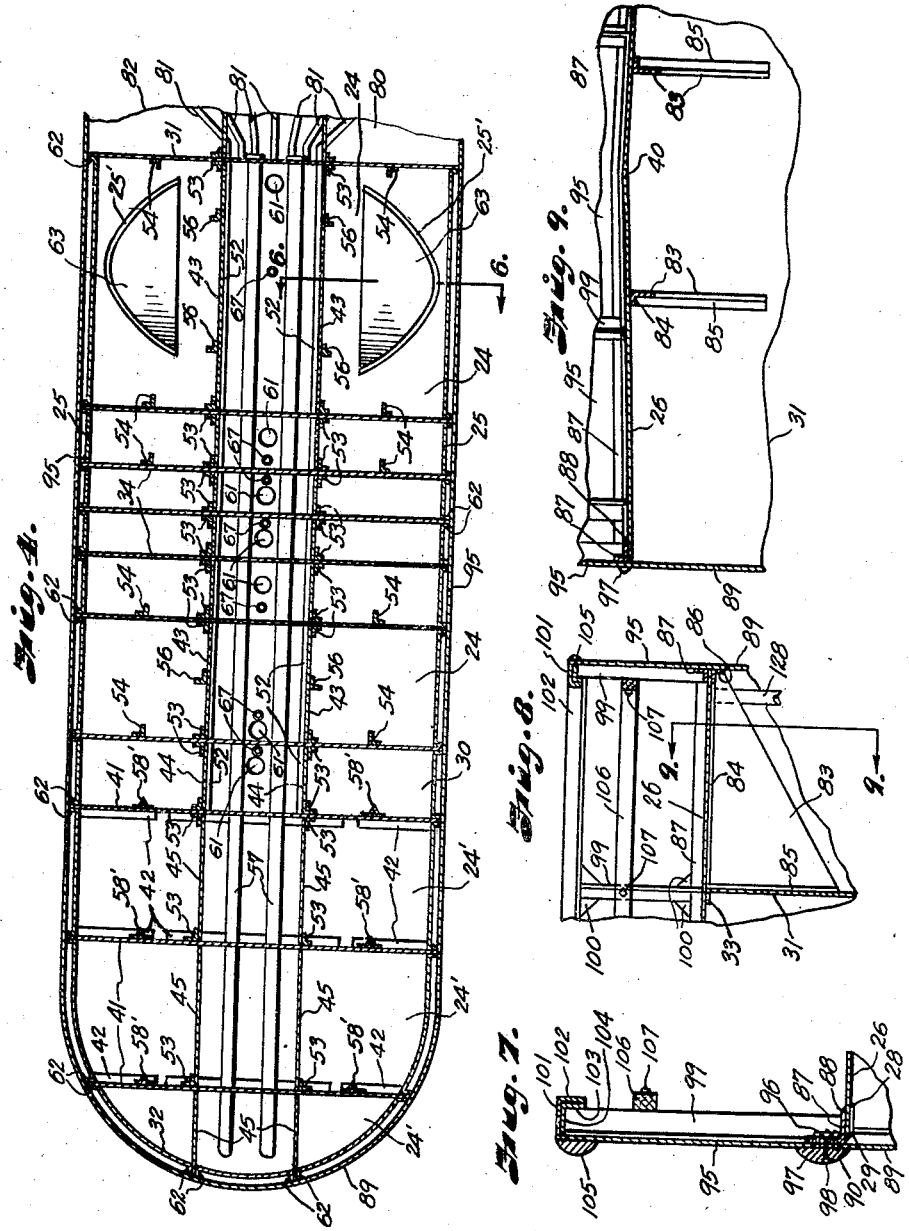
INVENTOR
Edward H. Gill
BY
ATTORNEY Nov. 8, 1938.                    E. H. GILL                      2,135,573
        COMBINATION SEMITRAILER TANK AND GENERAL DELIVERY BODY
                           Filed July 3, 1936              5 Sheets-Sheet 4
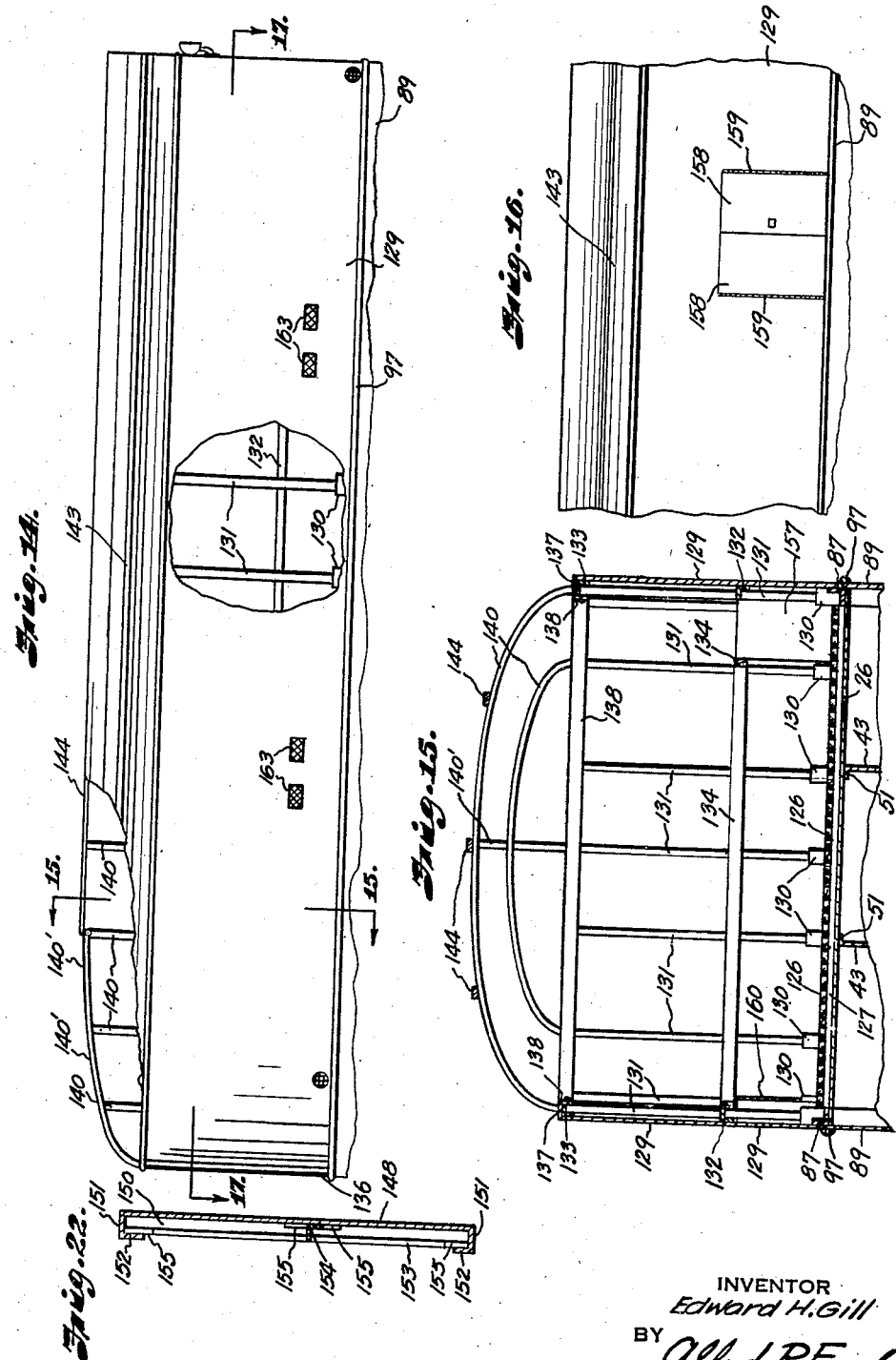
INVENTOR
Edward H. Gill
BY
Alfred R. Fuchs
ATTORNEY Nov. 8, 1938.  E. H. GILL  2,135,573
COMBINATION SEMITRAILER TANK AND GENERAL DELIVERY BODY
Filed July 3, 1936   5 Sheets-Sheet 5
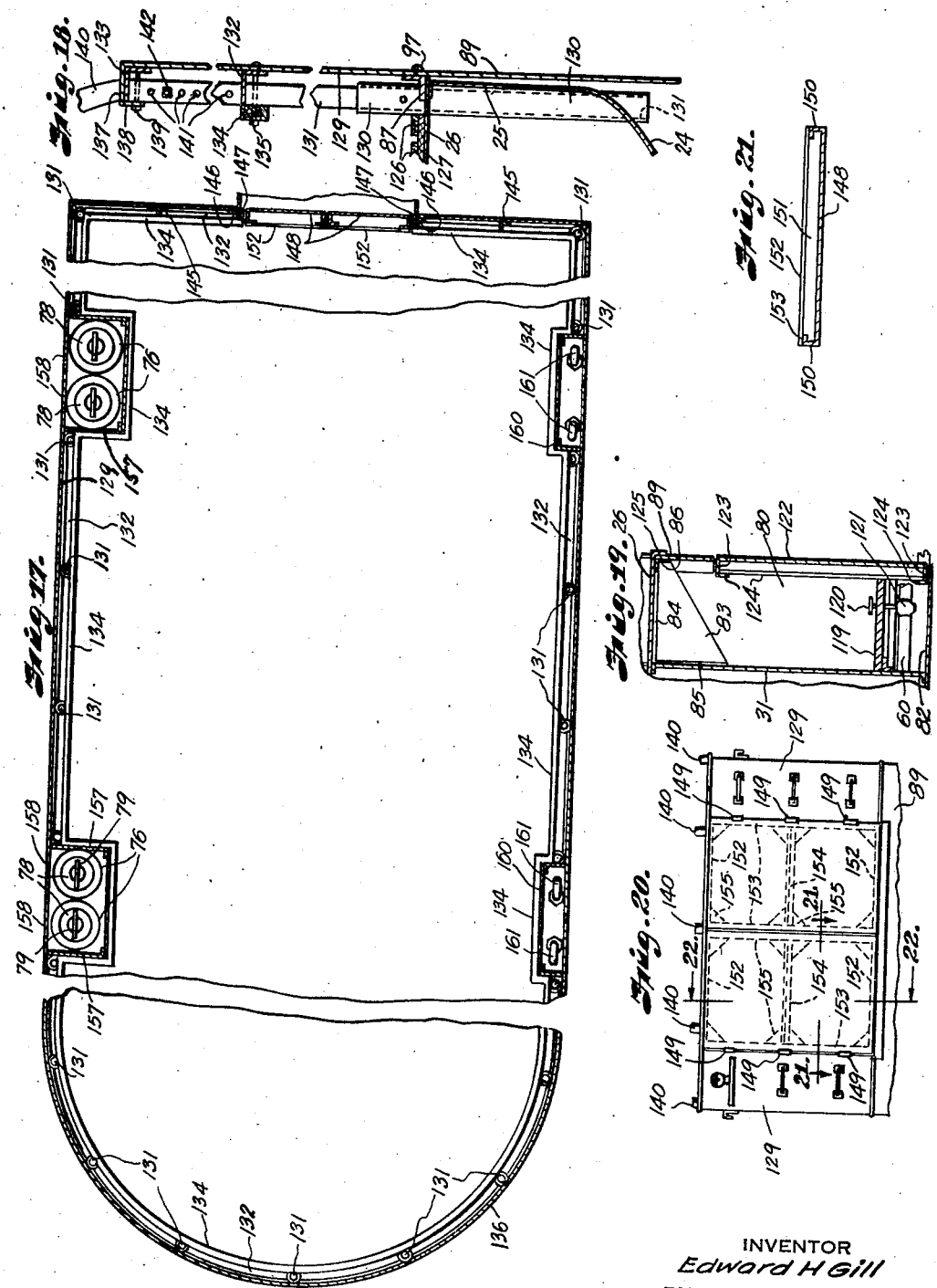
INVENTOR
Edward H Gill
BY Alfred R Fuchs
ATTORNEY Patented Nov. 8, 1938

2,135,573

UNITED STATES PATENT OFFICE 2,135,573

COMBINATION SEMITRAILER TANK AND GENERAL DELIVERY BODY

Edward H. Gill, Kansas City, Mo., assignor to Andrew A. Kramer, Kansas City, Mo.

Application July 3, 1936, Serial No. 88,803

18 Claims. (Cl. 280—5)

My invention relates to semi-trailer vehicles, and more particularly to a combination semi-trailer vehicle body comprising a tank portion and a body portion overlying the tank portion for carrying various materials and objects, such as loose material, packages, livestock, machinery, or any material that is ordinarily transported in a van or express type of body.

It is a purpose of my invention to provide a semi-trailer vehicle that is particularly adapted for use for hauling gasoline, or similar material, in one direction, and other materials in the opposite direction to avoid the hauling back of the empty trailer tank for refilling, thus greatly reducing the expense of marketing gasoline, or other similar petroleum products.

It is an important purpose of my invention to provide a device of the above mentioned character, in which the tank portion thereof is so made that the upper wall thereof serves as the major portion of the bed of the upper load carrying portion for carrying the various materials, above referred to, which overlies the tank portion, the top of the tank portion being made substantially flat in order to serve as a load carrying bed.

It is a specific purpose of my invention to provide a tank vehicle of the above mentioned character, in which the tank portion of the vehicle embodies within itself the semi-trailer frame which supports the load carried on the bed of the upper body portion, the said trailer frame comprising transverse plate-like members extending from the shell portion of said tank portion of the body to the top wall of said tank portion forming the load carrying bed, and longitudinally extending plate-like members integrally united with said transversely extending plate-like members and extending from said shell portion to said top wall and with said transversely extending plate-like members forming the rectangular semi-trailer frame.

It is a further purpose of my invention to provide a vehicle body of the above mentioned character, which has an offset in the under side thereof so that the same can be mounted on a pulling vehicle and be utilized as a semi-trailer with the center of gravity of the load at a very low point, the body being so constructed that the center of gravity of the load may be made as low as possible for a vehicle of this type, the center of gravity of the load of liquid contained in the tank portion being particularly low and that of the load carried by the upper body portion overlying the tank being made extremely low for the large tank capacity that is provided under the same.

It is a further purpose of my invention to provide a combination vehicle body of the above mentioned character, comprising a tank body portion that has a transversely curved wall portion and which runs substantially the full length of the vehicle, surmounted by an upper load carrying portion overlying the tank portion from end to end thereof, said tank portion terminating short of one end of said upper load carrying portion to provide a valve compartment under said load carrying portion, said vehicle being provided with a housing to enclose said tank portion and said valve compartment.

It is a further purpose of my invention to provide a combination semi-trailer body of the above mentioned character, in which inclined tubular members are provided for additional longitudinal bracing means for the tank portion, tying together the transversely extending plate-like members of the vehicle frame to brace the same and to serve as draft members for the trailer vehicle. Furthermore, said tank portion and said load carrying bed are provided with additional bracing means on the transverse wall portions formed by said plate-like members, on the longitudinally extending plate-like members, and at the junctions of said longitudinally extending and transversely extending plate-like members to prevent any flexing of said plate-like members under load.

It is also a purpose of my invention to provide a combination semi-trailer vehicle body having a tank portion of the above mentioned character, which is divided into compartments, each of said compartments being provided with a combined venting means and guide means for a measuring stick for determining the amount of liquid in any of said compartments.

It is another purpose of my invention to provide a combination vehicle body of the above mentioned character, in which external bracing means is provided for mounting the same on wheeled supports at spaced points, said bracing means being externally of and below the tank portion of said body and comprising longitudinally extending bracing members integrally united with other parts of the tank portion, such as the transversely extending bracing members. One of the objects of my invention is to utilize the pipe lines for draining the liquid from the tank as an external bracing means for the combination body.

It is still another purpose of my invention to provide the load carrying portion surmounting the tank portion, with vertically extending marginal walls to form an open topped body portion overlying the tank portion, which open topped body portion extends beyond the tank portion, the load carrying bed being provided with means for supporting the same from the tank portion comprising brackets integrally united with said tank portion and extending rearwardly therefrom under said load carrying bed.

It is still another purpose of my invention to provide filling means for said tank compartments and to provide enclosures for said filling means to protect the same, and further to provide removable portions for said marginal walls, whereby access may be had to said upper body portion at desired points.

It is still another purpose of my invention to provide means for stiffening the top edge portion of the marginal wall of the open topped upper body portion of a combination body, being provided with such open topped body portion.

It is a further purpose of my invention to provide a combination body of the above mentioned character, which has an upper body portion that is provided with an adjustable top forming a covered van body, and to provide means in such a van body for venting the tank compartments and for filling the tank compartments and to provide means for having ready access to said filling means from externally of said body.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in side elevation of one form of my improved combination semi-trailer vehicle, showing the same mounted on a pulling vehicle, the forward portion of which is broken away.

Fig. 2 is a longitudinal sectional view through the body portion of said semi-trailer, the rear end thereof being broken away.

Fig. 3 is a transverse sectional view through the tank portion of said body, taken substantially on the line 3—3 of Fig. 2, the upper body portion being broken away and said view being on an enlarged scale.

Fig. 4 is a horizontal sectional view through the tank portion of said body, taken substantially on the line 4—4 of Fig. 2.

Fig. 5 is a transverse sectional view of the tank portion of said combination body, taken substantially on the line 5—5 of Fig. 2, the upper body portion being broken away, and said view being on an enlarged scale.

Fig. 6 is a fragmentary section on an enlarged scale, taken through the wheel housing and adjoining portions of the vehicle shown in Fig. 1.

Fig. 7 is a fragmentary vertical sectional view of the upper body portion, on an enlarged scale, showing the side wall construction of the vehicle shown in Figs. 1 and 2.

Fig. 8 is a fragmentary vertical longitudinal sectional view of the rear end portion of the combination body shown in Fig. 1.

Fig. 9 is a transverse fragmentary sectional view taken substantially on the line 9—9 of Fig. 8.

Fig. 10 is a fragmentary inside face view of a removable side wall section of the upper body portion and the adjoining fixed wall portion in the form of combination body shown in Figs. 1 and 2.

Fig. 11 is a fragmentary section taken substantially on the line 11—11 of Fig. 10.

Fig. 12 is a transverse sectional view through the vent tube.

Fig. 13 is a fragmentary vertical sectional view through the upper end portion of one of said vent tubes and the adjoining top wall portions.

Fig. 14 is a view in side elevation of the upper portion of a modified form of combination body, the lower portion being broken away and the upper portion being partly broken away to show some of the interior construction.

Fig. 15 is a sectional view taken substantially on the line 15—15 of Fig. 14.

Fig. 16 is a fragmentary side elevational view of the opposite side of the body to that shown in Fig. 14.

Fig. 17 is a horizontal section taken on the line 17—17 of Fig. 14, partly broken away.

Fig. 18 is a vertical fragmentary sectional view partly broken away, of the mounting for the top supports and adjoining portions of the combination body.

Fig. 19 is a vertical sectional view on an enlarged scale, of the compartment under the rear end of the upper body portion rearwardly of the lower tank portion.

Fig. 20 is a fragmentary rear elevational view of the form of body shown in Fig. 14.

Fig. 21 is a horizontal sectional view on an enlarged scale through one of the doors, taken substantially on the line 21—21 of Fig. 20, and Fig. 22 is a vertical sectional view on an enlarged scale through one of said doors, taken substantially on the line 22—22 of Fig. 20.

Fig. 23 is a fragmentary longitudinal sectional view of a further modification.

Referring in detail to the drawings, my improved combination semi-trailer tank and general delivery body is shown in Fig. 1 as being mounted on a pulling vehicle, or tractor, 20 having the rear wheels 21, by means of a fifth wheel structure, indicated generally at 22, said vehicle being provided with rear wheels 23 and being thus mounted at a higher level at the forward end thereof than at the rear end thereof. Said combination semi-trailer comprises a lower or tank portion and an upper open body portion, in the form of the invention shown in Figs. 1 to 11, inclusive, said tank portion comprising a shell portion that has a transversely curved bottom wall 24, side walls 25 and a top wall 26, said top wall also serving as the load carrying bed of the upper open body portion. The side walls 25 are provided with inwardly directed flanges 27 that are welded at 28 and 29 to said top wall 26.

Upon reference to Figs. 3 and 5 it will be noted that the bottom wall 24' at the forward end portion of the combination tank and delivery body is only slightly curved as compared with the bottom 24 at the rear portion of the vehicle. It will also be noted that the forward end portion of said body is much shallower than the rear end portion thereof and that said reduced, or shallower, portion of said tank is connected with the deeper, or main body, portion of the tank by means of an inclined wall portion 30, thus providing an offset in the under side of said tank, whereby the transversely curved bottom portion at the forward end thereof is upwardly offset relative to the transversely curved bottom portion of the main body of the tank.

Said lower or tank portion is further provided with a rear transverse wall, or head, 31, the same comprising a transversely extending plate-like member and a forward curved wall or head, 32, which are provided with flanges 33 at the top thereof that are welded to said top wall 26 in a similar manner to the flanges 27. Other transverse wall portions, or partitions, are provided in the main body portion of said tank portion of the combination semi-trailer, which are very similar to the rear head 31 and which divide said main body portion into a plurality of compartments, said transverse wall portions being indicated by the numeral 34 and the flanges at the top thereof by the numeral 33, said flanges being secured to the top wall 26 of said tank portion in the same manner as the flanges 33 on the rear head 31.

The transversely extending plate-like members 31 and 34 are provided with downwardly extending portions 35, which extend beyond the shell portion and with projecting flanges providing fin portions, 36, which project beyond the shell portion 24. Said downward extensions 35 on the plate-like members 34 serve to mount said vehicle on the trailer wheels, in combination with external longitudinally extending bracing members 37 and reinforcing angles 38 thereon. The members 38 are welded to the members 37 and the longitudinally extending plate-like members 37 are welded to the shell 24, to the extensions 35 and to the horizontal flanges 39 on said extensions 35, said angle members 38 being also welded to said horizontal extensions 39. The fins, or flanges, 36 provided on the members 34 and 31 extending beyond the bottom 24 are provided for securing any desired apparatus to be carried by the tank to the under side of said tank body.

It will be noted that the top wall 26 of the tank portion inclines slightly downwardly from the center 40 thereof in both directions to the side margins of the vehicle. The forward end portion of the tank portion of said combination body is provided with transversely extending plate-like members 41, which are provided with flanges 33 just as are the other transversely extending plate-like members, the same being welded to the top wall 26 in the same manner as the flanges 33 on the transversely extending plate-like members 31, 32 and 34, but are provided with bottom flanges 42 that are welded to the inside of the shell portion of the tank portion of said body on the inner face of the bottom 24'. The forward head 32 is provided with a downward extension 35', which is similar to the downward extension 35 except that it is not provided with a flange thereon.

Said tank portion is further provided with longitudinally extending plate-like bracing members internally of the same, which are made up of the plate-like members 43 in the main body portion of said tank, extending from the bottom portion 24 of the shell of said tank to the top wall 26 thereof and being welded to the inner faces of said bottom 24 and said top wall 26. Said longitudinally extending plate-like bracing members further comprise plate-like members 44, which are similar to the members 43 except for the fact that these are provided with inclined bottom edges to conform to the inclination of the bottom portion 30, which joins the bottom portion 24 and the bottom portion 24', the same being welded to the inclined bottom 30 on the inner face thereof and to the top wall 26 on the inner face thereof.

In the reduced forward end portion of the tank the plate-like members 45 are provided, said plate-like members 45 extending also from the inner face of the top wall 26 to the bottom wall 24', and are welded thereto, but also extend beyond said bottom wall 24', as will be evident from Fig. 5, being provided with extensions 46, which are welded to the lips, or flanges, 47 provided on the side sections of the bottom wall 24', the central section of said bottom wall 24' being provided with the depending flanges 48, which are also welded to the extensions 46 of the plate-like members 45, and which terminate in outwardly directed horizontal flanges 49, thus forming external bracing means for the forward end portion of said tank body portion of the vehicle and providing a mounting for the transversely extending channel members 50, which are utilized for the purpose of mounting any desired upper fifth wheel structure under the semi-trailer. The longitudinally extending plate-like members 43, 44 and 45 are provided with inwardly directed flanges 51 at their upper ends, which are welded to the inner face of the top wall 26, and the members 43 and 44 with inwardly directed flanges 52 at their lower ends, which are welded to the bottom wall 24 and the inclined wall 30 on the inner face thereof. The longitudinally extending plate-like members 43, 44 and 45 collectively form a pair of longitudinally extending beams, or internal plate-like bracing members, running from end to end of the tank portion of said body from the top wall 26 to the bottom wall thereof and the external longitudinally extending bracing means 37 and 48 are substantially in alignment therewith, the load being thus transferred from said internal longitudinally extending bracing members to said external longitudinally extending bracing members.

The plate-like members 31, 32, 34 and 41 serve as transverse plate-like bracing members extending from the top wall of the tank to the bottom wall of the tank, and in certain cases, beyond said bottom wall, thus forming not only internal bracing means for the tank extending transversely thereof, but also external bracing means cooperating with the externally longitudinally extending bracing means. It will be noted that the longitudinally extending plate-like members and the transversely extending plate-like members cooperate to form a rectangular semi-trailer drop frame for the vehicle, serving all purposes of a frame for supporting the load carried on the bed formed by the top wall 26 of said tank portion of the vehicle, but at the same time serve both as longitudinal and transverse bracing means for the shell portion of the tank body comprising the bottom portions 24, 24' and 30 and the side wall portions 25.

It will also be noted that said longitudinal and transverse bracing members in cooperation with the transversely curved bottom portions 24 and 24' and inclined wall 30 and the top wall 26 form I-beam-like members running both lengthwise and crosswise of the vehicle, and that the side walls 25 in cooperation with the top wall 26 and the bottom wall 24 or 24' or 30, serve as longitudinally extending channel members, and thus also serve as part of the frame of the vehicle, all of said plate-like members and wall portions being integrally united by welding, and said external bracing means being also integrally united with the tank body by welding.

In order to provide stronger joints at the junction of the longitudinally extending plate-like members 43, 44 and 45 with the transversely extending plate-like members 31, 34 and 41, bracing members, such as the angles 53, are welded into the corners at the intersection of said longitudinal and transversely extending bracing members, said angle members 53 extending from the bottom wall to the top wall of the tank. It may be also found to be desirable to provide angular stiffening members 54 on certain of the transverse plate-like members within the tank body in order to further stiffen the same, it being noted that where said transverse plate-like members are extremely close together these intermediate bracing members are omitted.

It will be noted that the forward end wall 32 is curved (see Fig. 4), and intersects not only the longitudinally extending plate-like members 45, but also the forwardmost transversely extending plate-like member 41. The transversely extending plate-like members 34 divide the tank into compartments, serving as partitions completely shutting off the compartments from each other. The transversely extending members 41 are what might be called "false partitions" being provided for strengthening purposes only and not for dividing the tank into compartments, the same being provided with openings therein at 55 to provide communication between the different portions of the tank body forwardly of the forwardmost partition 34 and running from the curved front wall 32 to said forwardmost partition 34.

The longitudinally extending plate-like members where the compartments are particularly long, as is the case with the rearmost compartment in the tank shown, may be provided with vertically extending stiffening members 56, which are similar to the stiffening members 54, it being, of course, understood that said stiffening members are welded to the plate-like members with which the same are associated in all cases. Not only are the plate-like members prevented from flexing under load or due to the shifting of the contents of the tank, but additional means is provided internally of the tank to take care of the stresses on the tank body portion exerted by the draft of the pulling vehicle, because there is no frame aside from that incorporated in the tank body itself provided for the vehicle, this being accomplished by providing a pair of longitudinally extending tubular members, or draft tubes 57, which extend longitudinally through the vehicle from the rear head 31 of the tank portion thereof to the forward head, or end wall, 32 thereof, being inclined gradually upwardly from the rear head 31 to the front head, or curved forward wall portion 32. Said tubular members 57 extend through and are welded to the heads 31 and 32 and to all of the transverse plate-like members 41 and 34 so as to provide liquid-tight joints at the junction of the plate-like members and the tubular members 57, thus further preventing any breathing or flexing of the transverse plate-like members and, together with the longitudinally extending plate-like members 43, 44 and 45 forming the longitudinally extending beams of said framework, take care of the stresses exerted on the structure due to starting and stopping of the vehicle because of the fact that there is no frame structure aside from that embodied in the tank body itself to take care of these stresses.

The top wall of the tank is further strengthened and stiffened by means of the V-shaped stiffening members 58, which run lengthwise thereof and are provided with flanges 59 welded to the inner face of said top wall 26, said V-shaped members ending short of the transverse plate-like members and being interrupted at the vent tubes to be described below, in order that the ends thereof may be open and unobstructed so that liquid will not pocket in said V-shaped members. The external bracing means on the under side of the tank body from the rear end thereof to the offset therein is provided with additional longitudinal bracing means in the form of the drain pipes 60, which are welded into the extensions 35 of the transversely extending plate-like members 34, suitable connections being provided, such as at 61, between said tubes 60 and the compartments of the tank. The transverse walls 41 may also be provided with vertical V-shaped stiffening members 58', similar to the stiffening members 58.

It will be noted that the bottom wall portions 24, the side wall portions 25 and the curved forward end wall 32 are flanged outwardly at their junctions with the transversely extending plate-like members 31, 34 and 41, said outwardly flanged portions being indicated by the numeral 62 and the welds integrally uniting said plate-like members with said wall portions are thus provided on the outside of the tank body. The same is true of the curved forward head portion 32 where the same is intersected by the longitudinally extending plate-like members 45. Recesses, or upward offsets, are provided in the tank body over the rear wheels 23 to provide wheel housings therefor, the side wall 25 being flanged inwardly, as indicated at 25', to which is welded a top curved wall 63 for the wheel housing conforming in general to the curvature of the wheels, but spaced therefrom so as to provide sufficient room for the up and down movement of the body relative to the wheels as the vehicle travels over the roadway. The inner marginal edges of the wall portions 63 are secured by welding to flanges 64, provided at the top margins of the vertical walls 65, which vertical walls are connected with the bottom wall 24 by being welded to the upwardly directed flanges 66 on said bottom wall, (see Fig. 6).

Means is provided for venting each of the compartments of the tank body to prevent air pockets from forming therein near the top wall 26 as the compartments are being filled with liquid, said venting means comprising the split vent tubes 67, which extend from the bottom wall 24 to the top wall 26, the same being shown more in detail in Figs. 12 and 13. The tubular members are longitudinally split at 68 so as to permit liquid to enter the same and are provided with a flanged member 69 welded to the upper end thereof, said member 69 having a downwardly directed flange 70 receiving the tubular member 68 for welding the tubular member thereto, and being welded within a downwardly directed flange 71 on the top wall 26. Said tube not only serves as a vent tube, but also as a guide tube for a measuring stick, or similar member, which may be inserted therein for the purpose of measuring the quantity of liquid in the tank, the vent tubes being thus, preferably, located at such a point that the bottom thereof will extend to the lowest point of each tank compartment.

Said tubular members thus prevent the measuring stick from being inserted at an oblique angle, whereby inaccurate measurement of the liquid level in the tank compartment is prevented. This is particularly important in a tank of relatively small depth and great width, such as that shown in the drawings. An internal shoulder is provided at 72 in the flanged member 69 and an internally threaded portion 73 extends from the shoulder to the top portion of said flanged member. A plug 74 is screw-threadedly engaged with said threads, said plug having a polygonal opening 75 in the top thereof for engagement by a wrench so that the same can be unscrewed to vent the tank or to measure the contents of the tank.

The tank portion is further provided with upstanding filler members 76 extending upwardly from the top wall thereof a desired distance, the same being welded to an upwardly directed flange portion 77 on said top wall 26 and being provided with dome-shaped top portions 78 and with any suitable closure members, such as the lever operated closure members 79 shown in the drawings. It will be noted that the top wall 26, which forms the deck, or load carrying bed of the upper open body portion, extends rearwardly beyond the rear head 31, (see Figs. 8 and 9). Said rearward extension provides a compartment 80 rearwardly of the tank portion back of the head 31 and under the load carrying bed, or top wall 26, which may be utilized for any suitable purpose, such as a valve compartment, the extensions 81 of the pipe lines spreading out suitably for attachment of valves thereto in said compartment 80, as will be evident from Fig. 4, and said compartment being provided with a floor 82, if desired.

In order to support said rearwardly extending portion of the load carrying bed 26, brackets 83 are provided, which are substantially triangular in form and which are provided with the flanges 84 and 85 that are welded, respectively, to the under side of the bed portion 26 and the rear face of the rear head 31. Transverse angle members 86 are provided, which are welded to the brackets 83 and extend between said brackets and from said brackets to the opposite side edges of said extending portion of the bed 26 at the rear margin thereof to transversely brace and stiffen said rear end portion of said bed 26.

The combination top wall and bed portion 26 has the angle members 87 secured thereto, the same projecting slightly beyond the margins of the wall 26 and being secured thereto by means of the welds 29 and 88. The angles 87 extend slightly beyond the margins of the substantially horizontal wall 26 so that the skirting 89 can be secured to the upwardly extending leg of said angle and will clear the projecting welds 29 and other welds on the tank body, said skirting 89 extending downwardly below the bottom 24, below the inclined wall portion 30 and below the bottom 24' so as to completely hide the bottom and the structure on said bottom from view, said skirting being secured to the upward extension of the leg 87 by suitable securing elements 90.

While the skirting could be welded to the angle if desired, yet it is preferred to bolt the same in place because the skirting is, preferably, made of light gauge metal which might be warped out of shape in welding the same. The skirting not only extends on both sides of the combination body, but also around the front thereof and around the rear thereof, being provided with a curved edge portion 91 near the pulling vehicle wheels 21 and a curved edge portion 92 over the rear wheels 23 to thus give a finished appearance to the body. The rear transversely extending portion of the skirting 89 is secured by suitable securing elements to the angle 86. The bottom of the skirting is, preferably, provided with a stiffening angle 93 secured to the inner face thereof and with a rounded bead member 94 along the outer face thereof at said lower edge to give a finished appearance to said edge. The angle members 87 also serve to support the bottom edges of the vertical walls 95, which extend upwardly at the margins of the upper open body portion of said combination body, being rounded at the forward end thereof, as will be evident from Fig. 1.

The bottom edges of the vertical wall portions 95 are secured to the angle member 87 by means of the headed securing members in the form of bolts 96, a curved bead member 97 covering the joint and being held in place by means of suitable securing elements, such as the countersunk rivet members 98. Said vertical walls 95 are further supported and braced by means of the vertical angle members 99, which are welded to the angle members 87, being cut out suitably so that one leg of each angle 99 and of each angle 87 lies flush against the wall 95 after the same have been secured together, gusset plates 100 being provided between the angle members 87 and 99. The gusset plates 100 are welded to the angles 87 and 11. The top longitudinal edge of the vertical wall 95 is braced by forming a doubled flange portion thereon comprising the horizontally extending portion 101 and the depending portion 102, which is doubled back to provide the upwardly extending portion 103 and the horizontally extending portion 104 underlying the portion 101, said portions 101 and 104, and 102 and 103 being integrally united by welding. Gusset plates 100 are also provided between the integral flange thus formed on the side wall 95 at the top thereof and the vertically extending bracing members 99. Said vertical walls 95 are secured to the vertical bracing members by any suitable fastening elements. A rounded bead 105 is provided at the top of the wall portion 95 to finish off the same and hide said fastening elements. A rub rail 106 is provided running around the inside of the wall 95, being secured to the vertically extending angular bracing members 99 by means of suitable securing elements 107.

One or more removable sections may be provided in the vertical wall 95 to permit access to the contents of the open body portion from whatever point may be found to be the most convenient in the use of said combination body. In Figs. 1 and 2 such a removable section is shown at 108 in the side wall of the open body portion, said removable section being provided with the top marginal doubled flange portion, such as previously described as being provided on the wall 95 and being provided with vertically extending bracing angles 99, such as provided for the side walls 95 at the vertical end edges thereof, the material of said sections being, preferably, flanged around said angles 99 to cover the same, said flanges being indicated by the numeral 109 in Figs. 2 and 10. An angle 110, similar to the angle 87, is also provided along the bottom edge of the section 108 and vertically extending bracing members 111 are provided between the ends of the section 108, the same being substantially channel shaped with lateral flanges 112 secured to the inner face of the wall 108 by welding.

Suitable means is provided for holding the removable sections 108 in position in the wall 95, comprising hooks which are, preferably, provided at the four corners of the removable section, the top ones being only shown in Fig. 2, however, said hook-like members 113 being provided with depending leg portions 114, which are welded to the inner face of the removable section 108, and with depending leg portions 115 that fit back of keepers 116, which are welded to the adjacent ends of the wall portion 95, being provided with ears 117 for welding the same to said wall portion. It will be obvious that, with such securing means provided at the four corners of the removable section 108, it will be firmly held in position in alignment with the adjacent wall portions 95.

It will be noted that, due to the slight inclination of the wall portions 26 downwardly from the longitudinal central portion 40 thereof, the bed 26 for carrying the load of the upper body portion will be firmly braced and stiffened in a transverse direction between the supporting walls, or transverse plate-like members 34 and 41 and the end walls 31 and 32, and the walls 34 and 41 adjacent thereto. It will also be noted that the bottom 24' where the same joins the forward curved wall 32, is flanged downwardly, as indicated at 118 providing a depending flange, or lip, that is welded to said curved wall portion 32.

In the form of the invention shown in Figs. 14 to 22, inclusive, the lower body portion is made the same as in the form shown in Figs. 1 to 13, inclusive. Thus the rear compartment under the bed portion and rearwardly of the rear head 31 of the lower tank portion shown in Fig. 19, is provided in both forms of combination body shown in the drawings. Also the tank portion thereof is made in precisely the same manner in both forms of the invention.

The compartment 80, into which the pipes 60 extend, is provided with a raised floor 119 through which the handles 120 of the valves 121 extend, any suitable arrangement of faucets, or other devices, being provided on said pipes 60 at the extremities thereof. The compartment 80 is provided with suitable doors 122 at the rear thereof, whereby access may be had thereto, said doors being provided with flanged margins 123, which terminate in the flanges 124 providing reinforced edges for said doors. Any suitable arrangement of doors and storage compartments at the rear of the rear head 31 of the tank may be provided in either form of the invention. Thus in Fig. 1 side doors 122' are shown, in addition to the rear doors 122, the spaces provided on each side of the valves in the rear of the body being particularly adaptable for use for the storage of spare tires.

The upper body portion shown in Figs. 14 to 22, inclusive, is usable as a van body, being provided with means for making the same into a completely covered, or in effect, a completely closed body portion, the same having doors at the rear for entrance into the same. Where such rear doors are provided, that bed portion 26 is provided with a depending flange 125, which serves as a corner plate to protect the skirting 89 adjacent the same, it being, of course, understood that the top wall 26 of the tank body forming said bed is provided with a roughened top surface. It is, however, sometimes found to be desirable to provide, in addition to the top wall 26 of the tank body forming the bed, a wooden floor made up of the longitudinally extending planks 126, said planks 126 being mounted on transversely extending wooden members 127 that are secured to the angle members 87, previously described. The angle members 87 are provided on the top wall 26 in a similar manner to that described in connection with the form of the invention shown in Figs. 1 to 13, inclusive, and a skirting 89 is also provided on said body, which is similar to the skirting 89, previously described, and is mounted in a similar manner.

In a closed body of the character shown in Figs. 14 to 22, inclusive, it is, however, not necessary that the bed 26 be sloped for drainage purposes, as is the case in the open body, the open type of body being provided with suitable drains 128 in the rear corners of the deck 26 adjacent the side walls 95, through which the water will drain off the deck, due to the fact that the deck slopes slightly from the center 40 thereof to the side edges thereof. The upper body portion shown in Figs. 14 to 22, inclusive, is provided with a vertical wall portion 129, which extends much higher than the wall portion 95 and which is secured at the bottom thereof to the angle 87, which angle is welded to the top wall 26 of the lower tank portion.

Tubular socket members 130 are provided, mounted within the lower tank portion and welded to the curved shell portion 24 at their lower ends in liquid-tight relation, said tubular socket members 130 extending through suitable openings in the top wall 26 and being welded in said openings in liquid-tight relation with said top wall 26, extending upwardly above the same a suitable distance so that said angle members 87 may be welded thereto, the flanges of said angle members being cut away to accommodate the tubular members 130. Tubular members 131 are slidably mounted in the tubular members 130 and extend down to the bottom of the sockets formed thereby and have the horizontal angle members 132 welded thereto in spaced relation from the angle members 87, and also have the angle members 133 welded thereto at the upper ends thereof, said angle members having the horizontal flanges thereof suitably cut out to permit the tubular members 131 to pass therethrough. The side wall member 129 is fastened to the angle 87 in a similar manner to that previously described for the side wall 95 in the form of the invention shown in Figs. 1 to 13, inclusive, and the joint is covered by a rounded bead member 97, such as has been previously described.

A rub rail 134 is also provided, running around the inside of the wall 129, headed securing elements 135 extending through said wall 129, through the angle members 132 and the rub rail 134 to hold the parts in assembled relation. The tubular members 131 and 130 thus serve as vertical bracing means for the vertical wall portions 129 extending around the forward rounded end 136 of the body, as well as along the sides thereof. The angle members 132 and 133 run entirely around the vertical walls 129 on the inside thereof, and, together with the angles 87, act as horizontal bracing means for said wall 129, being welded to the members 131. The upper edge portion of the wall 129 is flanged inwardly at 137 and downwardly at 138, and suitable headed securing elements 139 extend through the flange 138 and through the angle 133 to firmly secure the parts together along the top edge of said wall portion 129.

The flange 137 is provided with suitable openings aligning with the tubular members 131 to permit passage of the tubular members 140, which are slidably received in the tubular members 131, through the flange 137. The tubular members 131 are provided with a row of openings 141, through any one of which a bolt-like member 142 may be passed for securing the tubular member 140 in adjusted position in the member 131, there being an opening in each member 140 adapted to be aligned with any one of the openings 141 for adjustment of the member 140, and for securement of the member 140 in such adjusted position.

The tubular members 140 serve as supporting means for the top 143, which may be made of flexible material, such as canvas, said members 140 being of a bowed character, as will be clear from Fig. 15, and decreasing in height and span thereof toward the forward end of the body. The reduced forward members 140 are connected together by a longitudinally extending member 140', which is similar to the members 140, being made in the form of a tube and being welded to the tubular members 140 that the same intersects. Wooden slats 144 are provided, which extend longitudinally of said top, being secured to the members 140 and running from the member 140 secured to the rear end of the member 140', rearwardly to the rear end of said body.

It will be seen that, due to the arrangement of adjusting means referred to above, considerable vertical adjustment of the supporting means for the top 143 can be obtained so that a covered body can be provided that is adjustable in height for receiving extraordinarily high containers, or pieces of machinery, or anything of that character. The rear wall of the body, instead of being provided with the tubular bracing members 131, is provided with vertical angles 145 adjacent the margins of the door opening 146, and between said door openings 146 and the members 131 at the rear corners of the body, said members 145 being suitably welded to the angles 87, 132 and 133 to form a rigid frame at the rear of said body for supporting the vertical wall 129, the wall 129 being flanged at 147 around the angle 146 so as to provide a smooth edge adjacent the doors 148, said doors being hinged to the vertical wall 129 at 149. Said doors are shown more in detail in Figs. 21 and 22, the same being provided with flanges 150 along the vertical edges thereof, and flanges 151 along the horizontal edges thereof, which are provided with flanges 152 and 153 turned inwardly and overlapped in the manner shown in Figs. 21 and 22 and welded together.

Bracing angles 154 are also provided, extending transversely of said doors midway between the top and bottom thereof, said angles being welded to the vertically extending flanges 150 on said doors. Gusset plates 155 are also provided at the intersections of the vertical and horizontal flanges on said doors and at the intersections of the angles 154 with said vertical flanges, said gusset plates being welded to the vertical and horizontal flanges and to the angle members 154.

The filler members 76, in the form of body shown in Figs. 14 to 22 inclusive, are preferably, mounted in suitable housings 157, which extend from the side walls 129 and entirely enclose said members 76 to prevent any damage thereto by the movement of any of the contents of the upper body portion. Said members 76 are constructed in the same manner as previously described, and the same reference numerals are applied thereto. The housings 157 extend well above the tops of the members 76 so as to fully enclose the same, and in order to provide access to said filler members to fill the compartments of the tank body, doors 158 are provided, which are hinged to the side wall 129 at 159, and which may be opened to remove the closures from the filler members 76 and to pass any suitable filler means, such as a hose, or pipe, through the same into the open upper ends of the members 76 after the closures have been removed. The rub rail 134 is offset so as to pass around the housings 157, as will be evident from Fig. 17. Similar housings 160 are provided for the vents 161 for the compartments of the lower tank portion and the rub rail 134 is offset around the housings 160, as will also be evident from Fig. 17. In order to ventilate the housings 160 in which said vents 161 are provided, screened vent openings 163 are provided in the side wall 129 opening into the spaces within the housings 160.

In either form of the combination body described above, the rear axle 165 may have the central portion thereof offset downwardly, as indicated at 166, the springs 167 supporting the body on the rear wheels 23, being secured by suitable U-bolts 168 to the depressed portion 166 of said rear, or trailer, axle. By so depressing the axle, an unusually low center of gravity and low loading edge for the bed portion of the body is obtained.

Instead of providing the vertically extending stiffening angles 99 for the upper side wall portion, the inclined stiffening angles 199 shown in Fig. 23 may be provided, the same being arranged so as to form a truss in combination with the angle 87 and the upper reinforced portion of the side wall 95. The angles 199 are suitably cut out that the same can be welded to lie flatly against the wall 95.

I claim:

1. A combination drop frame semi-trailer vehicle comprising a plurality of longitudinally extending vertical web portions and a plurality of transverse vertical web portions integrally united to form a rigid rectangular trailer framework, a top load supporting wall mounted on said vertical web portions and integrally united therewith to stiffen said framework, and a shell portion comprising a bottom wall portion and side wall portions secured in liquid tight relation with said top load supporting wall to form a tank body, said vertical web portions comprising portions lying within said tank body and forming transversely and longitudinally extending bracing means for said tank body and dividing said tank body into a plurality of compartments, said web portions being integrally united with said shell portion to stiffen said framework and said shell portion, certain of said transversely extending web portions extending from said top wall through said tank body and extending downwardly beyond the bottom thereof and a trailer wheel assembly connected with said extending web portions to transfer the load carried by said top wall through said web portions to said wheel assembly.

2. A combination drop frame semi-trailer vehicle comprising a plurality of longitudinally extending vertical web portions and a plurality of transverse vertical web portions integrally united to form a rigid rectangular trailer framework, said longitudinally extending vertical web portions having reduced forward portions providing upwardly offset bottom edges thereon, a substantially flat top load supporting wall mounted on said vertical web portions and integrally united therewith to stiffen said framework, and a shell portion comprising a bottom wall portion and side wall portions secured in liquid tight relation with said top load supporting wall to form a tank body, said vertical web portions comprising portions lying within said tank body and forming transversely and longitudinally extending bracing means for said tank body and dividing said tank body into a plurality of compartments, said web portions being integrally united with said shell portion to stiffen said framework and said shell portion, the transversely extending web portions intersecting the unreduced portions of said longitudinal web portions extending from said top wall through said tank body and extending downwardly beyond the bottom thereof, a trailer wheel assembly, the bottom of said shell portion being offset at the offset in said longitudinally extending web portions to provide a reduced forward end on said tank body of less depth than the main body portion thereof and longitudinally extending bracing members underlying the bottom of said main body portion and connected with said extending web portions and said trailer wheel assembly to transfer the load carried by said top wall through said web portions to said wheel assembly.

3. A combination drop frame semi-trailer vehicle, comprising a combination semi-trailer body having a lower tank portion and an upper enclosed load carrying portion surmounting said tank portion, comprising a load carrying bed, said upper load carrying portion having vertical marginal walls, tubular members communicating with the interior of said tank portion extending upwardly from said bed adjacent said marginal walls and housings for said tubular members adjacent said vertical walls, said walls having openings therein leading into said housings.

4. In a vehicle of the character described, a load carrying wall, vertical marginal walls extending upwardly from said load carrying wall, a stiffening reinforcing formation along the top edges of said marginal walls, and obliquely extending reinforcing members on said marginal walls extending from said stiffening formation to adjacent the bottom edges of said marginal walls.

5. The combination with a pulling vehicle having a fifth wheel structure and a trailer rear wheel assembly, of a combination body comprising a lower tank portion and an upper freight carrying portion, said freight carrying portion comprising a load supporting bed forming the top wall of said tank portion and said tank portion comprising a drop trailer frame supporting said load supporting bed upon said pulling vehicle and trailer wheel assembly, said frame comprising vertically extending bracing means integral with said tank portion extending from said load supporting bed to said fifth wheel structure and said trailer wheel assembly to transfer the load supported on said bed to said pulling vehicle and said rear trailer wheel assembly.

6. A combination drop frame semi-trailer vehicle, comprising a combination semi-trailer body having a lower tank portion and an upper freight portion surmounting said tank portion, said body comprising a wall common to said tank and freight portion constituting the top wall of said tank portion and a load carrying bed, said upper freight portion having vertical side walls extending upwardly from said common wall, and a skirting depending from said common wall in substantial alignment with said side walls on both sides of said body and enclosing said tank portion.

7. A combination drop frame semi-trailer vehicle comprising a combination semi-trailer body having a lower tank portion and an upper load carrying portion surmounting said tank portion, said upper load carrying portion having an upstanding side wall, transverse partition means dividing said tank portion into a plurality of compartments, filler means for said compartments adjacent said side wall and venting means for said tank compartments spaced from said filler means.

8. A combination drop frame semi-trailer vehicle, comprising a combination semi-trailer body having a lower tank portion having a reduced forward end and an upper load carrying portion surmounting said tank portion, said body comprising a wall common to both portions thereof to provide a combined top wall for said tank and load carrying wall for said load carrying portion, said common wall and upper body portion extending endwise beyond said tank portion at the rear end thereof, and a housing enclosing the space under said common wall lying endwise beyond said tank portion, valves within said housing and a movable closure on said housing providing access to said enclosed space.

9. A combination drop frame semi-trailer vehicle, comprising a combination semi-trailer body having a lower tank portion and an upper load carrying portion surmounting said tank portion, said body comprising a load carrying bed, and said lower tank portion including supporting means for said bed, said load carrying bed extending endwise beyond said tank portion, and brackets connecting said endwise extending load carrying bed with said tank portion to support said bed on said tank portion.

10. The combination with a pair of spaced wheeled supports one of which is materially higher than the other thereof, of a combination semi-trailer body mounted on said supports, said body having a transversely curved bottom that is offset to provide a depressed transversely curved bottom portion extending from over the lower of said supports to said offset and a raised transversely curved bottom portion extending from over the higher of said supports to said offset, said body comprising a lower tank portion having said offset bottom and having a substantially flat top wall providing a reduced end portion on said tank body overlying said higher support, and an upper load carrying portion of substantially uniform height overlying said entire tank portion and extending over both said supports, said flat top wall constituting the load carrying bed of said upper load carrying portion, said upper portion having substantially vertical side walls and said top wall having a vertical skirting depending therefrom aligning substantially with said side walls and extending below the bottom of said tank portion from end to end thereof.

11. In a combination vehicle body, a lower tank portion surmounted by a load carrying bed, said tank portion having a shell portion, and internal bracing means for said body comprising longitudinally extending vertical plate-like members secured along the lower edge thereof to said shell portion and along the upper edge thereof to said bed, transversely extending plate-like members secured to said shell portion and said bed and continuous tubular members extending longitudinally through said tank portion in spaced relation to said longitudinally extending plate-like members and integrally united with all said transversely extending plate-like members, certain of said transversely extending plate-like members extending downwardly beyond said shell portion and longitudinally extending bracing means externally of said shell portion connecting said extending portions of said transversely extending plate-like members comprising a plurality of pipe lines.

12. A combination semi-trailer body having a lower tank portion and an upper load carrying portion surmounting said tank portion, said upper load carrying portion having vertical marginal walls, a top, and adjustable supporting means for said top, comprising vertical socket members carried by said marginal walls, curved top supporting members having depending end portions receivable in said socket members and means for securing said top supporting members in any one of a plurality of adjusted positions in said socket members.

13. A combination drop frame semi-trailer vehicle, comprising a combination semi-trailer body having a lower tank portion and an upper load carrying portion surmounting said tank portion, comprising a load carrying bed, said upper load carrying portion having vertical marginal walls, tubular members communicating with the interior of said tank portion extending upwardly from said bed adjacent said marginal walls and housings for said tubular members.

14. A combination body of the character described, comprising a lower tank portion and an upper, enclosed, freight carrying portion, a common wall forming the top wall of said tank portion and the load supporting wall for said freight carrying portion, said freight carrying portion having upstanding marginal walls secured to said common wall, bracing means for said upstanding walls comprising tubular vertically extending members secured to said upstanding walls, and tubular socket members mounted in said tank portion and extending through said common wall, said socket members telescopically receiving said tubular vertically extending members.

15. A combination body of the character described, comprising a lower tank portion and an upper, enclosed, freight carrying portion, a common wall forming the top wall of said tank portion and the load supporting wall for said freight carrying portion, said freight carrying portion having upstanding marginal walls secured to said common wall, bracing means for said upstanding walls comprising tubular vertically extending members secured to said upstanding walls, horizontally extending bracing means extending along the top edges of said upstanding walls, horizontally extending bracing means intermediate the top and bottom edges of said upstanding walls, and means connecting said horizontally extending bracing means with said tubular members.

16. A combination body of the character described, comprising a lower tank portion and an upper, enclosed, freight carrying portion, a common wall forming the top wall of said tank portion and the load supporting wall for said freight carrying portion, said freight carrying portion having upstanding marginal walls, upstanding filling means for said tank portion adjacent one of said upstanding walls, an opening in said upstanding wall through which access is had to said filling means and closure means for said opening.

17. A combination body of the character described, comprising a lower tank portion and an upper, enclosed, freight carrying portion, a common wall forming the top wall of said tank portion and the load supporting wall for said freight carrying portion, said freight carrying portion having upstanding marginal walls, upstanding vent means for said tank portion adjacent one of said upstanding walls and a housing for said vent means, said upstanding wall having a vent opening for said housing.

18. A combination body of the character described, comprising a lower, tank portion and an upper, enclosed freight carrying portion, said tank portion having a top wall and said freight carrying portion having upstanding marginal walls secured to said top wall, bracing means for said upstanding walls comprising tubular vertically extending members secured to said upstanding walls, and a rub rail secured to said tubular members.

EDWARD H. GILL.